(No Model.) 2 Sheets—Sheet 1.
H. J. E. JENSEN.
FILTERING APPARATUS.
No. 424,303. Patented Mar. 25, 1890.
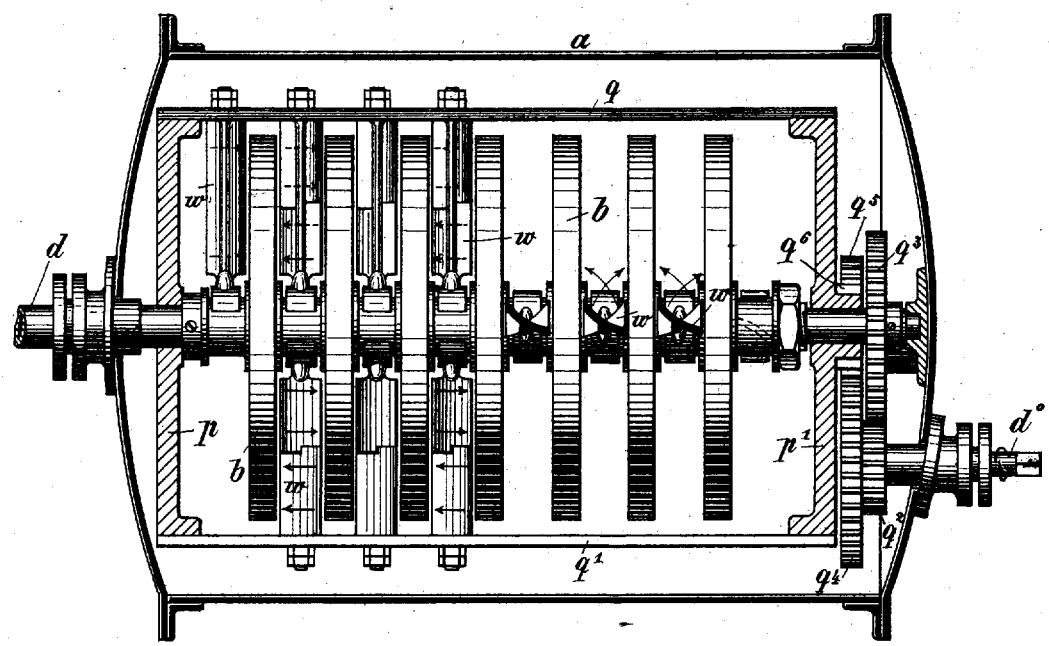
Fig. 1.
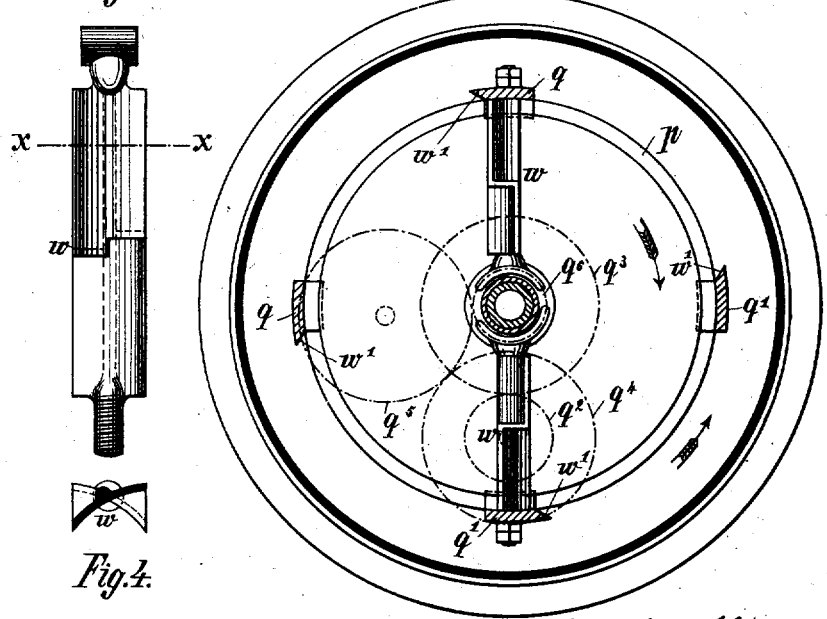
Fig. 3. Fig. 2. Fig. 5.
Fig. 4.

(No Model.) 2 Sheets—Sheet 2.
H. J. E. JENSEN.
FILTERING APPARATUS.
No. 424,303. Patented Mar. 25, 1890.
Fig. 6. Fig. 7.
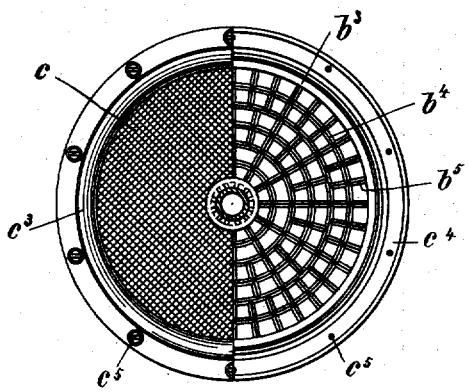 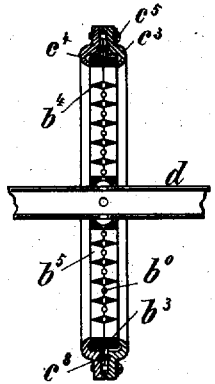
Fig. 8.
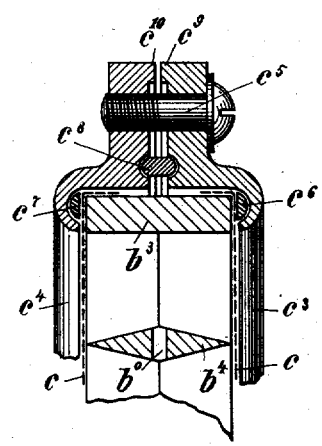
Fig. 9. Fig. 10.
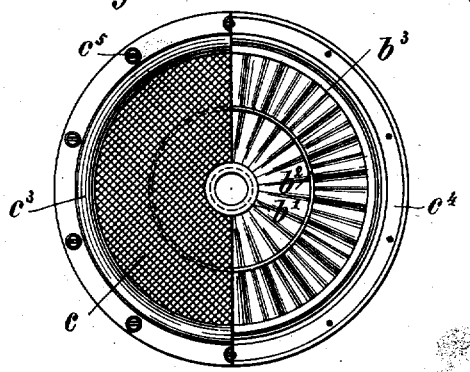 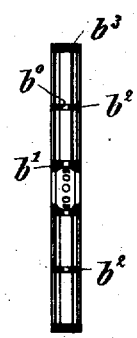
Inventor Heinrich J. E. Jensen
By Paine and Ladd Atty
Witnesses
H. V. Colton
Walter Scott

UNITED STATES PATENT OFFICE.

HEINRICH JÜRGEN ERNST JENSEN, OF HAMBURG, GERMANY, ASSIGNOR OF ONE-HALF TO EDWARD FERDINAND GUSTAV BUSCH, OF SAME PLACE.

FILTERING APPARATUS.

SPECIFICATION forming part of Letters Patent No. 424,303, dated March 25, 1890.

Application filed November 7, 1889. Serial No. 329,536. (No model.)

*To all whom it may concern:*

Be it known that I, HEINRICH JÜRGEN ERNST JENSEN, a subject of the German Emperor, and a resident of Hamburg, in the German Empire, have invented certain new and useful Improvements in Filtering Apparatus, of which the following is a specification.

My invention relates to improvements in cleaning off the surfaces of the drums of filtering apparatus and to the construction of the body of such drums, as well as to the method of fixing the porous cover upon which the actual filtering material is deposited.

The subject-matter of the present invention is particularly applicable to that class of filtering apparatus as described in the specification of the United States Letters Patent No. 403,073. The class of filtering apparatus described in the said specification consists of a number of drums mounted upon a hollow shaft, which is journaled within a casing and serves to convey the liquid filtered by passing from the exterior into the interior of the said filtering-drums. As these drums are either made of porous material—such as burned clay or the like—or after the manner of sieves, screens, with mineral or vegetable fibers—such as asbestos or cellulose—adapted to act as filtering material on the outside, the latter needs to be temporarily renewed and the porous surface of the said drums cleaned. For this reason I employ the mechanism illustrated in the accompanying drawings, in which—

Figure 1 is a longitudinal and Fig. 2 a cross-section of the casing and partly of the cleaning devices of the filtering-drums. Figs. 3, 4, and 5 are two side elevations and a cross-section on the line $x\,x$ of rotated wings adapted to agitate water or other liquid for washing off the filtering-drums. Fig. 6 represents a filtering-drum with partly-removed porous cover, upon which the actual filtering material is deposited. Fig. 7 is a cross-section of a filtering-drum. Fig. 8 represents a part of Fig. 7 in enlarged scale, and Figs. 9 and 10 are a side view and cross-section of a slightly-modified body of the filtering-drums.

$a$ is the casing wherein the filtering-drums $b$ are arranged on the hollow shaft $d$, extending beyond the cover of the casing and serving as a discharge-pipe. In front of the actual filtering-faces of the drums $b$ a number of wings or blades $w$, attached to a rotated frame $g\,g'$, which is secured to the shaft $d$ by means of the disks or arms $p\,p'$, are adapted to agitate the cleansing-liquid contained in the vessel $a$ in such a manner that at a certain direction of rotation of the wings $w$ the liquid is thrown against the filtering-surfaces at an acute angle. For this reason the wings $w$ may be so arranged that the one part of the wings is adjusted to agitate the cleansing-liquid for washing off the one side and the other part for cleaning the opposite surface of the filtering-drums; or each wing or blade $w$ may be formed in such a manner that the one half of the surface of the wing will throw the cleansing liquid to one side and the other half to the opposite side, as indicated by the arrows in Fig. 1. In this latter case it will be required to reverse the direction of the corresponding surfaces of the wings on one side $g$ of the frame toward those of the opposite side $g'$, so that $f\,i$, the halves of the wings next to the frame, will throw the cleansing-liquid against the outer annular part of both adjacent filtering-surfaces and the halves of the wings next to the axis of rotation will throw the liquid against the corresponding inner annular surfaces of the relative filtering-drums. In this manner a proper paring of the filtering-bed deposited upon the cover of the filtering-drums will be caused, and thereby a more effectual cleaning of the filtering-surfaces obtained than heretofore.

In some cases I provide either the ends of the wings $w$, extending beyond the circumference of the filtering-drums, or the frame to which the wings are attached with an inclined projection $w'$, which on rotation of the wings will serve as deflector for the cleansing-liquid in such a manner that the direction of the latter obtained from the centrifugal force will be caused to divert against the periphery of the drums, whereby a more perfect separation of the filtering-bed (fibers of asbestus or cellulose) from the outer border of the filtering-drums will be effected.

As for the purpose of performing the described cleansing of the filtering-surfaces the vessel $a$ only needs to be partly filled with the cleansing-liquid, I preferably impart a proportional slow rotating motion also to the filtering-drums simultaneously with but contrary to that of the wings, as indicated by the arrows, Fig. 2. For this reason I employ an intermediate gearing, consisting of the wheels $g^2$ $g^3$ $g^4$ $g^5$ $g^6$, of which the wheels $g^2$ $g^4$ are attached to the shaft $d^0$, extending through a stuffing-box beyond the cover of the vessel $a$ of the filtering-drums, while the wheel $g^3$ is connected to the shaft $d$ of the latter and the wheel $g^6$ to the arm or disk $p'$ of the frame $g$ $g'$. Motion is then imparted by a crank or other mechanical means from the wheel $g^2$ to the wheel $g^3$ upon the shaft $d$, and thereby the drums $b$ rotated in one direction, and from the wheel $g^4$ by means of the intermediate wheel $g^5$, transmitted upon the wheel $g^6$ of the arm or disk $p'$, whereby the frame $g$ $g'$, with the wings $w$, is rotated in opposite direction to the drums, as desired.

In Figs. 1 and 2 of the drawings one half of the number of wings $w$, with their frame $g$ $g'$, are thought to be turned about ninety degrees toward the other half, in order to better demonstrate the formation and action of the wings. In practice, however, it might be sufficient to arrange the wings all together in the same plane.

When the filtering-drums are to be made of solid porous material—such as burned clay—I prefer to make them of two parts, tightly connected together at their outer circumference, but provided at their inner surfaces with a sufficient number of annular and radial or nearly radial grooves for the purpose of more easily and uniformly conducting the filtered liquid into the hollow shaft or discharge-pipe $d$, upon which the disks are mounted. If it is, however, preferred to use a woven fabric or wire-gauze $c$ as support to the vegetable or mineral filtering-fibers to be deposited thereon, I construct the body of the filtering-drums $b$ in the form of a grate, Figs. 6 and 7, composed of annular and radial bars $b^4$ $b^5$, or of corrugated sheets of any suitable material, Figs. 9 and 10. The said corrugations radiate from the center of the drum, in order to conduct the filtered liquid into the perforated hollow shaft $d$, and the corrugated surface may be composed of two or more annular corrugated sheets separated by a corresponding number of plain rings $b^2$, which have to be provided, as well as the hub $b'$ of the drums, with radially-bored passages $b^0$, corresponding with the radial corrugations of the surrounding annular sheets, in order to satisfactorily conduct the filtered liquid into the hollow shaft $d$. The compartments formed by the said grating communicate with each other and with the perforations of the hollow shaft or discharge-pipe $d$ by holes or canals $b^0$, formed in the annular as well as the radial bars of the grating.

The woven fabric or wire-gauze $c$, supporting the actual filtering-fibers, will be fastened to the body of the drums by means of two rings $c^3$ $c^4$, put over the said woven fabric or wire-gauze from both ends of the drums and bearing against the outer rim $b^3$ of the same. These rings are provided with suitable annular cavities for the reception of the packing-rings $c^6$ $c^7$ $c^8$ and clamped together by the aid of screw-bolts $c^5$ and the projecting rings $c^9$ $c^{10}$ on the outer periphery of the rings, which are adapted to cause the rings $c^3$ $c^4$ to converge at the outer rim of the body of the drum under the action of the screw-bolts $c^5$, in order to easier produce a tight joint at the outer circumference of the drums.

Having now particularly described my invention, what I claim, and desire to secure by Letters Patent, is—

1. In a filter, the combination, with a central shaft and a series of filtering-drums secured thereto, of a series of revolving wings $w$, having their inner ends loosely secured to said shaft and provided with oppositely-projecting flanges, substantially as set forth.

2. In a filter, the combination, with a central shaft and a series of filtering-drums secured thereto, of a revolving frame and a series of wings $w$, secured at their outer ends to said frame and having their inner ends loose on said shaft, and provided with oppositely-projecting flanges, substantially as set forth.

3. In a filter, the combination of a central revolving hollow shaft having perforations therein, a series of filtering-drums secured thereto and having passages communicating with said shaft, and a series of revolving wings located between said drums and designed to move in opposite directions thereto, substantially as set forth.

4. In a filter, the combination of a central revolving hollow shaft having perforations therein and a series of filtering-drums secured thereto and having passages communicating with said shaft, a revolving frame, and a series of wings secured to said frame at their outer ends and provided with oppositely-projecting flanges, substantially as set forth.

5. In a filtering apparatus consisting of a vessel wherein one or more filtering-drums are located, the combination of the body of the drum, the woven fabric or wire-gauze for supporting the actual filtering-fibers, and the outer clamping-rings provided with cavities for the reception of suitable packing-rings and kept together by screw-bolts or other equivalent devices, substantially as and for the purpose set forth.

In testimony that I claim the foregoing as my invention I have signed my name, in presence of two witnesses, this 5th day of October, 1889.

HEINRICH JÜRGEN ERNST JENSEN.

Witnesses:
 DIEDRICH PETERSEN,
 FRANZ SCHURZ.